(No Model.)
J. WILSON.
SELF CHALKING CHALK LINE.
No. 523,189. Patented July 17, 1894.
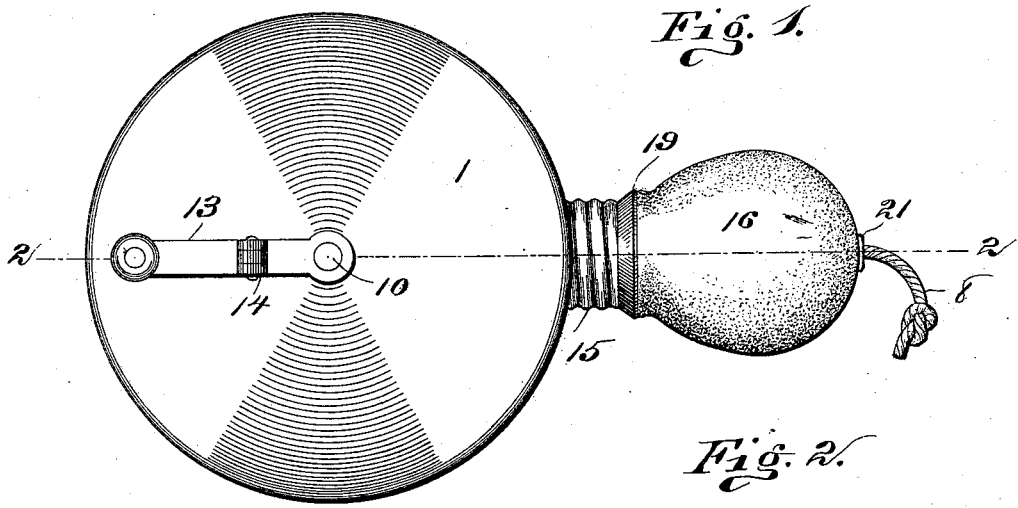
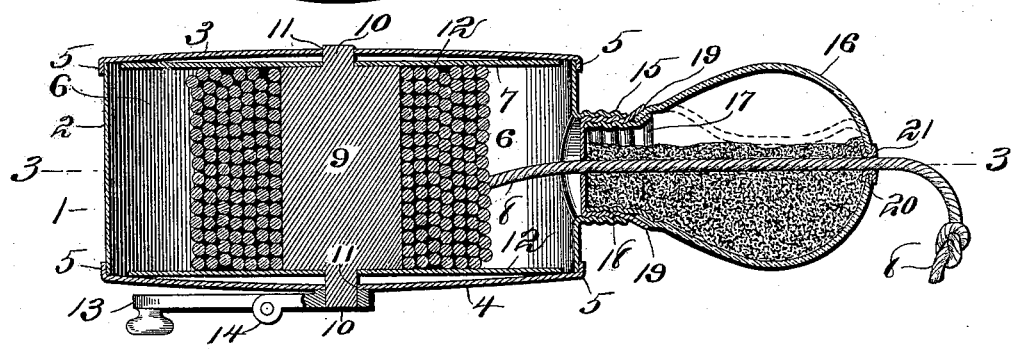
Witnesses:
W. J. Dankey
M. P. Smith
Inventor:
James Wilson
by Higdon Higdon Longan
Attys.

# UNITED STATES PATENT OFFICE.

JAMES WILSON, OF COLUMBIA, MISSOURI.

SELF-CHALKING CHALK-LINE.

SPECIFICATION forming part of Letters Patent No. 523,189, dated July 17, 1894.

Application filed January 15, 1894. Serial No. 496,885. (No model.)

*To all whom it may concern:*

Be it known that I, JAMES WILSON, of Columbia, Boone county, and State of Missouri, have invented certain new and useful Improvements in Self-Chalking Chalk-Lines, of which the following is a full, clear, and exact description, reference being had to the accompanying drawings, forming a part hereof.

My invention relates to an improved self-chalking chalk line, and consists in the novel construction, combination and arrangement of parts hereinafter described and designated in the claim and illustrated in the accompanying drawings, in which—

Figure 1 is a side elevation of my improved self-chalking chalk line. Fig. 2 is a horizontal transverse section of the same, said section being taken on the line 2—2 of Fig. 1. Fig. 3 is a vertical longitudinal central section of the improved self-chalking chalk line, said section being taken on the line 3—3 of Fig. 2.

The object of my invention is to construct a chalk line reel with a receptacle for holding chalk, through which the line passes.

A further object of my invention is to construct a receptacle to be placed on a chalk line, said receptacle constructed to contain the chalk.

A further object of my invention is to construct a receptacle of suitable flexible material to be connected to a chalk line reel for containing chalk to be applied to said line by said receptacle being drawn over the line, or the line drawn through said receptacle.

Referring to the drawings: the numeral 1 designates the cylindrical casing in which the reel upon which the chalk line is wound is located, and to which the receptacle, which contains the chalk, is connected either permanently or detachably, but as illustrated in the accompanying drawings, said receptacle is shown detachably connected to said casing.

The casing 1 is constructed of an annular rim 2, which is preferably made of thin sheet metal, such as tin and the like. This rim is of suitable length to contain the reel and it is closed by ends 3 and 4. These ends 3 and 4 are each constructed with an annular flange 5, which overlaps the ends of the rim 2, and are connected to said rim by solder, or in any well known suitable manner. By the construction of the rim and the ends, a chamber 6 is formed therein, in which is placed the reel 7, upon which the chalk line 8 is wound when not in use. This reel is constructed of a drum 9, upon each end of which is formed a trunnion 10. These trunnions are engaged by suitable apertures 11 formed in the ends 3 and 4 of the casing and form bearings for the reel 7. Connected to each end of the drum 9 is a disk 12. These disks are of suitable size that they will readily rotate within the chamber of the casing 1, and the purpose of these disks is to prevent the line 8 from coming in contact with the ends 3 and 4 when said line is wound upon the drum 9. The trunnion 10 projects a suitable distance out from the end 4 of the casing 1 so that a handle, such as 13, can be connected thereto for turning the reel for winding the line 8 thereon. This handle is constructed with a hinge 14 intermediate its ends, so that the free end thereof can be doubled back over the engaged end, so that said handle will not occupy as great a space when it is doubled as when it is straight.

Formed on or fixed to the rim 2 of the casing 1 in any suitable place is an outwardly projecting screw-threaded boss 15, and the opening therein registers with a suitable opening formed in the rim 2.

16 indicates the chalk receptacle, which is constructed of rubber, or like material, and formed in the shape of an egg; or it can be round, the shape or design not materially altering my invention. This chalk receptacle 15 is provided with a suitable opening in one side, in which is placed and connected by gum, or other suitable material, a screw-threaded neck 17. The end of the neck which is engaged by the receptacle 16 is provided with an outwardly projecting flange, over which the adjacent end of said receptacle is lapped. (See Figs. 2 and 3 for illustration.) The free end of said neck is closed by a screw-threaded cap 18. This cap is preferably made of material such as tin, and is pressed so that the screw-threads will be both on the outer and inner periphery thereof, so that it can be screwed onto the screw-threaded neck 17, and also be screwed into the boss 15. This cap is constructed with an outwardly flaring annular flange 19 at one end, which engages a portion of the receptacle 16 when said cap is screwed upon the neck 17. The opposite end of said cap is closed to prevent the chalk which is placed within the receptacle from being discharged into the chamber 6 of the casing 1 when said receptacle is connected to said casing. A suitable opening 20 is formed in the closed end of the cap 18, in which an eyelet 21 is located. This eyelet 21 is to prevent the line from coming in contact with the receptacle as the line passes through it and wearing said receptacle, it being made of rubber, or like material, as hereinbefore stated, the friction of the line would easily wear the opening 21 so large that the chalk would be discharged therefrom, and hence be wasted.

When the line is wound up, as illustrated in the drawings, and it is desired to chalk the same, the operator fastens the free end of said line to a suitable object and grasps the casing 1 with one hand and the chalk receptacle 16 with the other hand, and presses said receptacle as illustrated by dotted lines in Fig. 2 until the required friction is given to the line to make the chalk adhere thereto; the operator moves the reel away from the free end of the line, which will cause said line to unwind from the reel and be drawn through the chalk in the receptacle 16, which, as hereinbefore stated, causes the chalk to adhere to the line. After the line has been unwound, and it is desired to re-chalk it, the operator can readily detach the receptacle 16 from the casing 1 by unscrewing the cap 18 from the receptacle and moving said receptacle along the line.

For placing chalk within the receptacle 16, the operator first removes said receptacle from the casing 1; then removes the cap 18 from the receptacle, which will give free access to the interior of said receptacle through the neck 17.

After the required amount of chalk has been placed within the receptacle, the cap can be readily replaced by screwing it upon the neck 17.

What I claim is—

A self-chalking chalk line, comprising the following elements, to-wit: a casing 1 constructed of a rim 2 and ends 3 and 4, a reel 7 located in said casing and having its bearings in the ends thereof, said reel constructed of a drum 9, to which is connected disks 12, a screw-threaded boss 15 formed on or fixed to the rim 2 of the casing, a receptacle 16 detachably connected to said boss, a neck 17 connected to said receptacle, a cap 18 having an opening therein for closing said neck, an eyelet 21 located in the opening 20 in the receptacle 16, the opening in the cap 18 and the eyelet constructed to allow the chalk line 8 to pass through the receptacle, all arranged and combined substantially as herein specified.

In testimony whereof I affix my signature in presence of two witnesses.

JAMES WILSON.

Witnesses:
JNO. C. SCHWABE,
A. REES.